United States Patent [19]

Springett et al.

[11] Patent Number: 5,617,849
[45] Date of Patent: Apr. 8, 1997

[54] RESPIRATOR HAVING THERMOCHROMIC FIT-INDICATING SEAL

[75] Inventors: James E. Springett, Hudson, Wis.; Leonard W. Barrett, Maplewood, Minn.

[73] Assignee: Minnesota Mining and Manufacturing Company, St. Paul, Minn.

[21] Appl. No.: 526,909

[22] Filed: Sep. 12, 1995

[51] Int. Cl.⁶ .................................................. A62D 5/00
[52] U.S. Cl. ........................ 128/206.24; 128/201.23; 128/202.22; 128/205.25; 128/206.14; 128/206.21; 128/206.28
[58] Field of Search .................. 128/202.22, 205.23, 128/205.25, 206.21, 206.23, 206.24, 206.28, 201.14, 206.14, 201.33

[56] References Cited

U.S. PATENT DOCUMENTS

| | | | |
|---|---|---|---|
| 2,249,867 | 7/1941 | Snelling | 73/335 |
| 3,580,051 | 5/1971 | Blevins | 73/40 |
| 3,830,224 | 8/1974 | Vanzetti et al. | 128/2 H |
| 3,951,133 | 4/1976 | Reese | 128/2 H |
| 4,146,025 | 3/1979 | Warncke et al. | 128/142.4 |
| 4,302,971 | 12/1981 | Luk | 73/356 |
| 4,437,471 | 3/1984 | Nelson | 128/736 |
| 4,488,547 | 12/1984 | Mason | 128/202.22 |
| 4,501,503 | 2/1985 | Buirley et al. | 374/162 |
| 4,765,325 | 8/1988 | Crutchfield | 128/202.13 |
| 4,827,924 | 5/1989 | Japuntich | 428/206.12 |
| 4,832,011 | 5/1989 | Busch | 128/202.13 |
| 4,846,166 | 7/1989 | Willeke | 128/200.24 |
| 4,875,477 | 10/1989 | Waschke et al. | 128/206.26 |
| 4,883,547 | 11/1989 | Japuntich | 156/73.4 |
| 4,914,957 | 4/1990 | Dougherty | 73/40 |
| 4,951,664 | 8/1990 | Niemeyer | 128/206.24 |
| 5,299,448 | 4/1994 | Maryyanek et al. | 73/40 |
| 5,357,693 | 10/1994 | Owens | 36/71 |

FOREIGN PATENT DOCUMENTS 2266669  11/1993  United Kingdom ............. 128/201.12

*Primary Examiner*—V. Millin
*Assistant Examiner*—V. Srivastava
*Attorney, Agent, or Firm*—Gary L. Griswold; Walter N. Kirn; Karl G. Hanson

[57] ABSTRACT

Respirator 10 has a respirator body 11 that is configured to fit over the nose and mouth of a wearer. A thermochromic material 18 is positioned on the respirator body 11 such that the thermochromic material 18 makes thermal contact with the wearer's face when the respirator 10 is worn. The contact causes the thermochromic material 18 to change color to allow the wearer to determine if a proper fit has been established.

12 Claims, 1 Drawing Sheet

5,617,849

RESPIRATOR HAVING THERMOCHROMIC FIT-INDICATING SEAL

TECHNICAL FIELD

This invention pertains to a respirator that has a thermochromic fit-indicating face seal.

BACKGROUND OF THE INVENTION

Respirators (also referred to as "face masks" and "filtering face masks") are worn over the breathing passages of a person for two common purposes: (1) to prevent contaminants from entering the wearer's breathing track; and (2) to protect others from being exposed to pathogens and other contaminants exhaled by the wearer. In the first situation, the respirator is worn in an environment where the air contains substances harmful to the wearer, for example, in an auto body shop. In the second situation, the respirator is worn in an environment where there is a high risk of infection, for example, in an operating room.

To accomplish either of these purposes, the respirator must be able to maintain a snug leak-free fit to the wearer's face—otherwise, the wearer or persons in the vicinity of the wearer may be exposed to harmful contaminants.

For instance, the failure to obtain a leak-free fit when using a negative pressure respirator—i.e., a respirator that has a filter, and the wearer's lungs draw the air through the filter—allows air to enter or exit the interior of the respirator without passing through the filter media. Unfiltered air drawn into the respirator's interior can enter the wearer's breathing passage, and unfiltered exhaled air may expose others to contaminants exhaled by the wearer. In positive pressure respirators—i.e., respirators where uncontaminated oxygen or air is fed to the wearer from a pressurized vessel—an unsatisfactory fit not only exposes the wearer and others to contaminants, but it also is wasteful in that pure oxygen or air from the vessel can pass unused into the ambient environment.

Although there are many properly designed respirators that are very capable of achieving leak-free fits, wearers often encounter difficulties in determining whether or not a proper fit has been established. After donning the respirator, wearers frequently make adjustments in hopes of obtaining the proper fit, but without an accurate test they cannot determine for certain if they are safe. To put the wearer's mind at ease, investigators have developed a number of test procedures that are useful for determining whether leaks are present in both negative and positive pressure respirators.

Known test procedures may be classified as being qualitative or quantitative, and examples of each type are briefly described below.

Qualitative Fit Testing

A negative pressure respirator typically is fit tested by donning the mask, covering the air inlet with the palm of the hand, and inhaling until the mask is slightly collapsed. If this position is held for approximately 10 seconds and no leakage is noticed, the fit is presumed to be adequate.

The fit of a positive pressure respirator may be similarly tested by donning the mask, covering the air outlet with the palm of the hand, and exhaling until the mask is slightly distended. If this state is held for about 10 seconds and no leakage is noticed, the fit is presumed to be adequate.

U.S. Pat. No. 5,299,448 describes a positive pressure test apparatus for fit testing a face piece respirator having an exhalation valve. The apparatus is mounted over the exhalation valve, and the exhalation valve is sealed by depressing a plunger. The wearer exhales, holds this state, and determines whether outward air leakage is detected and whether the face piece remains adequately distended.

Respirator fit also may be qualitatively tested by exposing a respirator wearer to a detectable test material in the form of a vapor or mist. When using this test, the respirator must be capable of filtering out the test material so that only when a leak occurs between the mask and the wearer's face is the test material detected by the wearer. Common test materials include isoamyl acetate vapor (banana oil), saccharin, and an irritating smoke containing hydrochloric acid.

Qualitative tests have a number of drawbacks. A first drawback is that the tests strongly rely on the user's subjective interpretation. The level of test material detected by one person may not be detected by another, or the tester's sense of smell may be dulled or deteriorate during testing. Similarly, an inward or outward leakage of air detected by one person may not be detected by another. Another drawback is that when hand pressure is used to close the air inlet or outlet, it can force the respirator into better contact with the face than during actual use. Also, the hands may be gloved and may interfere with covering the inlet or outlet, or the gloves themselves may be contaminated. And quite often an adequate qualitative fit at rest is not determinative of an adequate fit under work conditions where movement and heavy breathing conditions generally preside.

Quantitative Fit Testing

Quantitative tests differ from qualitative tests in that there is an attempt to actually measure the amount of leakage or to measure a difference in pressure.

U.S. Pat. No. 3,580,051 describes a quantitative method for testing masks for leaks by hermetically sealing a flow meter at the mask's mouth area. The flow meter monitors leakage due to external pressure during the mask wearer's breathing function.

U.S. Pat. No. 4,146,025 describes a device for fit testing that uses a bag-like headpiece that is placed over the respirator and the wearer's head. The headpiece is filled with a breathable test gas, and leakage is evaluated by measuring the test gas in the exhaled air.

U.S. Pat. No. 4,765,325 describes a method and apparatus for determining respirator fit, where the method involves placing the respirator on the person's face and partially evacuating air in the face piece while the subject holds his breath and clamps his nostrils. Air that leaks into the face piece is measured by the apparatus, which is a mass flow meter that is in line with the vacuum source.

U.S. Pat. No. 4,832,011 describes an attachment for testing the fit of a personal protective respirator. The attachment is secured to the respirator's exhalation valve and in this position provides a port for receiving tubing that connects the attachment's interior to an external gas analysis system.

U.S. Pat. No. 4,846,166 discloses a method and apparatus for fit testing respirators. In carrying out the method, the wearer positions the respirator over the nose and mouth, inhales and holds their breath, and then records the pressure in the respirator with reference to time. The method can be quantitative by establishing a leak hole of known dimension, repeating the above procedure, and comparing the result to calibration curves.

U.S. Pat. No. 4,914,957 describes a leak test adaptor for facilitating respirator fit testing. The adaptor has a pressure-responsive gas flow regulating means and a gas sampling port for facilitating leak testing on face mask respirators.

Quantitative tests may be disadvantageous because they sometimes require a specially adapted respirator that is similar to but is not the actual respirator that is worn, or the tests employ procedures and equipment that make it somewhat difficult to perform frequent testing and retesting in the work environment. And like qualitative tests, an adequate fit at rest may not be determinative of an adequate fit under work conditions.

Thermochromic Liquid Crystal Technology

Thermochromic liquid crystals are commonly used to visually display temperature changes. The crystals are capable of displaying different colors at different temperatures, and with this ability have found a number of niche utilities—for example, in the medical field to detect physiological changes associated with temperature. Background information on thermochromic materials may be found in Parsley, Dr. M., *The Hallcrest Handbook of Thermochromic Liquid Crystal Technology* (1991).

Thermochromic liquid crystals have been produced that are operative in the temperature range of the skin, but it is believed that none have been used to determine whether a respirator properly fits a wearer's face. What follows is a brief outline of some liquid crystal products that have been disclosed in the patent literature.

U.S. Pat. No. 4,501,503 discloses coating compositions containing cholesteric liquid crystals that give temperature-dependent color changes. The color changes are capable of providing thermal images when in contact with human body surfaces.

U.S. Pat. No. 4,302,971 describes a liquid crystal temperature indicator for measuring human body temperature. The indicator has a number of liquid crystal deposits, each activatable at a different temperature, and arranged behind temperature-indicating numerals that are visible when the liquid crystal deposit is activated. The indicator preferably has an adhesive to attach it to a body surface such as the forehead.

U.S. Pat. No. 3,830,224 describes a liquid crystal device for displaying a change or gradient in the skin temperature. Through strategically locating the temperature sensing means, ovulation and other physiological changes can be visually noticed by viewing the liquid crystal display.

U.S. Pat. No. 3,951,133 discloses a liquid crystal device that allows skin temperature changes to be detected by displaying visible color changes. Liquid crystal thermal-film-strips change color at a different temperatures and are assembled side by side and wrapped around a finger. The device shows color changes to a patient or doctor so that tension can be evaluated as a function of skin temperature.

U.S. Pat. No. 4,437,471 discloses an implement for measuring skin temperatures. When the user touches the implement, liquid crystals indicate the individual's temperature, and the implement thus can allegedly assist the user in learning to relax.

SUMMARY OF THE INVENTION

This invention has a thermochromic material on a respirator body that is configured to fit over at least the nose and mouth of the wearer. As the term is used throughout this document, "thermochromic" means being able to significantly change color when exposed to relatively minor changes in temperature. The term "respirator" means a device that supplies air to and/or purifies air for a person wearing the device. The thermochromic material is positioned on the respirator body so that it thermally contacts the wearer's face when the respirator is worn. The thermochromic material changes color when in thermal contact with the wearer's face to visually display where skin contact does and does not occur. Leaks are present where thermal contact does not occur, and thus the color change allows the wearer to visually determine whether a proper fit has been established.

The invention is advantageous in that it quickly allows the wearer to determine whether a leak-free fit has been obtained. The invention may be used to select a properly-fitting face mask, or it may be used to assist the wearer in learning how to adjust the respirator to fit their face. Unlike prior art test procedures, this invention tells the wearer the precise location of the leak so that a correct adjustment can be made. Compared with qualitative methods, the invention depends less on the user's subjective evaluation, and it can more definitively indicate the seal's status, giving the wearer an added sense of security. The invention also does not require test gases, and compared with quantitative methods is faster and less complicated, and it can use a respirator that is actually worn by the user and not a similar one.

Because of these advantages, wearers are more likely to test their respirator to ensure that a proper fit is initially established and thereafter maintained. The thermochromic material's highly visible character can serve as a regular reminder to test for leaks and reinforces the need to obtain a good fit. By increasing awareness and frequency of testing, the invention provides a safer environment for the wearer and others. The above and other advantages are more fully shown and described in the drawings and detailed description of this invention, where like reference numerals are used to represent similar parts. It is to be understood, however, that the drawings and description are for the purposes of illustration only and should not be read in a manner that would unduly limit the scope of this invention.

DETAILED DESCRIPTION OF THE PREFERRED EMBODIMENTS

Figure 1:
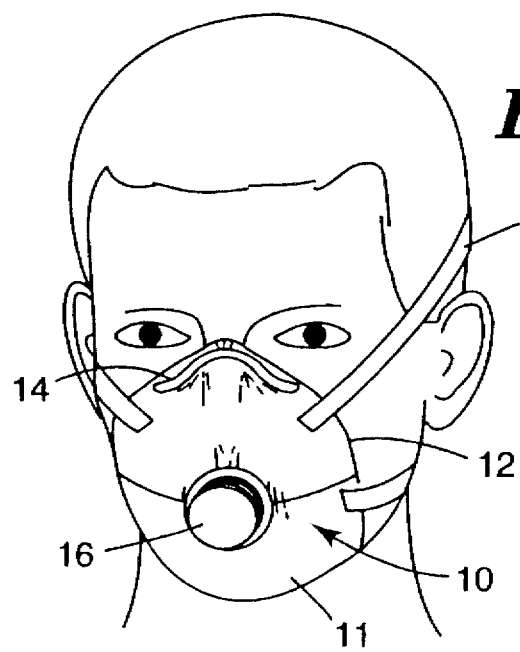
FIG. 1 illustrates a front view of a respirator 10 of the invention disposed on a person's face.
Figure 2:
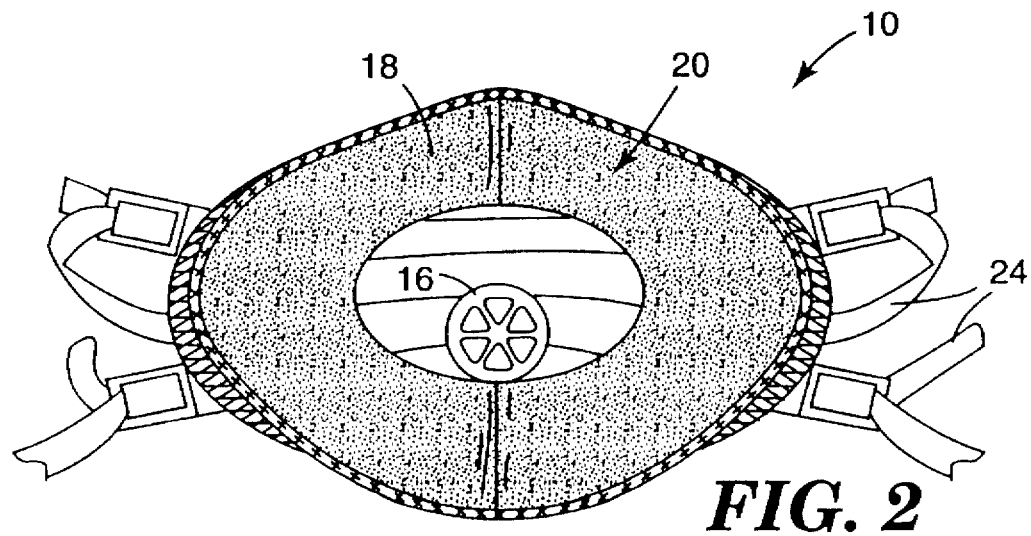
FIG. 2 illustrates a back view of a respirator 10 in accordance with the present invention.

FIG. 1 illustrates a person wearing a negative pressure respirator 10 that has a cup-shaped respirator body 11. Respirator 10 generally conforms to a wearer's face around the whole perimeter 12 of respirator 10. In the region of the nose, however, there is radical change in contour on the person's face, and leaks sometimes occur in this area. To prevent leakage, an adjustable nose clip 14 is often provided on the respirator 10. The nose clip 14 typically is made from a linear dead-soft band of aluminum that can be easily conformed by applying hand pressure. Other nose clips have been shown, for example, in U.S. patent applications 08/322,576 and D-29/029,750 filed by Castiglione. Often an exhalation valve 16 is furnished to facilitate purging air from the interior of respirator 10, and this too can assist in preventing leakage; see for example, U.S. Pat. No. 5,325,892 (incorporated here by reference). FIG. 2 shows a thermochromic material 18 that is disposed on the respirator's face seal 20. As illustrated, the thermochromic material 18 preferably is located on face seal 20 about the whole periphery (360 degrees) of the respirator body. It may be possible, however, in some embodiments to simply place the thermochromic material 18 in areas where leaks are likely to occur, such as in the nose region and where the mask contacts the chin.

When the face seal thermally contacts the wearer's face, heat from the skin causes the thermochromic material to become colored. Using common thermochromic formulations, the face seal initially turns red, and then as it is further warmed by the wearer's skin, passes through the other colors of the visible spectrum.

The face seal material underlying the thermochromic material preferably is black to make it easier to see the color change. The face seal may be made from a soft rubbery material such as a thermoplastic elastomer (for example, Kraton™, available from Shell Oil Company), a polyvinyl chloride foam, polyethylene/ethylene vinyl acetate foam, or a urethane foam; see for example U.S. Pat. No. 4,827,924 at column 4, lines 33–40.

The thermochromic material only needs to make thermal contact with the wearer's face for the invention to be operative. The thermochromic material does not necessarily have to actually contact the wearer's skin. Indeed, it may be preferred that there is a protective layer—for example, a thin plastic film—overlying the thermochromic material. A thin film can protect the thermochromic material to increase its useful service life.

Figure 3:
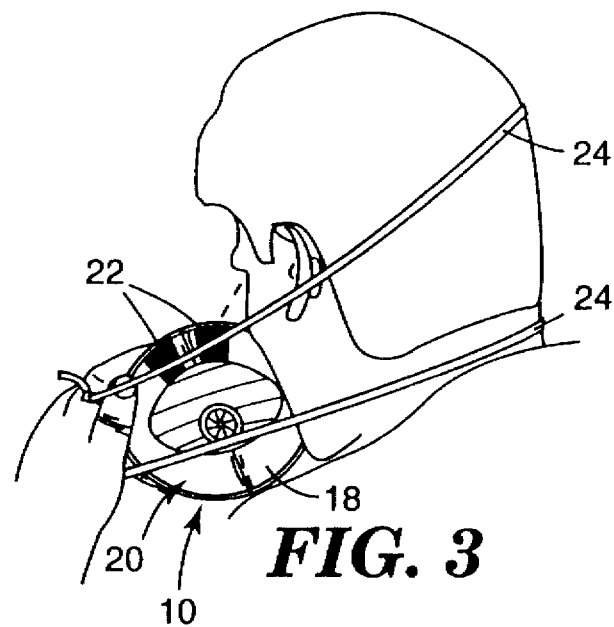
FIG. 3 illustrates a side view of a person evaluating whether a proper fit has been established in accordance with the present invention.

FIG. 3. shows how a wearer can readily determine whether the respirator 10 correctly fits their face. The wearer simply displaces respirator 10 from their face and quickly glances at the thermochromic material 18. In areas 22 where the skin has not made adequate contact with the thermochromic material 18, no color change is observed. The face seal 20 retains its original color, which typically is black. In the areas 22, the wearer needs to further adjust the mask shape by, for example, bending the nose clip or by tightening headbands 24.

Although the respirator 10 shown in the drawings is a negative, cup-shaped, half-mask respirator, it is entirely conceivable that the invention could be used in essentially any other respirator, for example, a positive pressure respirator or a full-face respirator (covers nose, mouth, and eyes). The respirator also could have removable cartridges that contain activated carbon filters. The invention also could be used in conjunction with respirators such as masks worn by pilots (also known as aviator's face masks), scuba masks, and the like, and in surrogate respirators, i.e., respirators that are purely used by wearers to evaluate fit.

Thermochromic materials that can be used in the invention may be essentially any presently known or later developed thermochromic material that is capable of changing color when in thermal contact with a person's skin.

Thermochromic materials may be in the form of liquid crystals. Known thermochromic liquid crystals are essentially divided into two categories, cholesteric and chiral nematic. These two types of liquid crystals and combinations of them may be used in this invention.

Thermochromic liquid crystals show color by selectively reflecting incident white light. Thermochromic liquid crystals generally change from transparent to red at a given temperature and, as the temperature is increased, pass through the other colors of the visible spectrum in sequence—orange, yellow, green, blue, and violet—before turning transparent again at higher temperatures. Thermochromic material is best viewed against a black nonreflecting background for best color visualization.

The color change may be reversible or irreversible. Reversible thermochromic materials are preferred in this invention and on cooling display a reverse color change sequence.

"Temperature-insensitive"—sometimes called shear-sensitive or clearing point—formulations also may be used in this invention. These mixtures reflect just a single color below a given transition temperature (called the clearing point) and change to transparent above it.

Preferred thermochromic materials for this invention have a 27° C. red start temperature and a 17° C. bandwidth. More preferred materials have a 30° C. red start temperature and a 10° C. bandwidth. The "bandwidth" is defined as the temperature at which light is reflected at 470 nanometers (approximate blue start temperature) minus the temperature at which light is reflected at 650 nanometers (approximate red start temperature). A preferred temperature-insensitive thermochromic liquid crystal has a red clearing point of about 37° C., the average human skin temperature.

Because thermochromic liquid mixtures tend to be very sensitive and susceptible to change during processing, care should be exercised when applying the materials to the respirator body. An example of a thermochromic material that is suitable for use in this invention is the liquid crystal paint, Licritherm™ TCS-1001 from EM Industries, Inc. of Hawthorne, N.Y. This liquid crystal paint can be coated onto the face seal material of a respirator using conventional coating techniques such as screen printing, ink jet printing, roll coating, and brushing. Other thermochromic materials are available from Hallcrest Products, Inc., Glenview, Ill. Thermochromic materials generally dry at room temperature and afterwards change color in response to temperature changes. The thermochromic material also could be applied in the form of a preconstructed sheet material that has the thermochromic material disposed between a transparent plastic top sheet and a backing. Such a construction could be adhered or laminated to the face seal.

The following Example has been selected merely to further illustrate features, advantages, and other details of the invention. It is to be expressly understood, however, that while the Example serves this purpose, the particular ingredients and amounts used as well as other conditions and details are not to be construed in a manner that would unduly limit the scope of this invention.

EXAMPLE

Thermochromic liquid crystal paint, Licritherm™ TCS-1001, obtained from EM Industries, Inc. of Hawthorne, N.Y., was coated onto a black face seal material of a 3M model 9970 respirator (construction described in U.S. Pat. Nos. 4,827,924 and 4,883,547, incorporated here by reference), and allowed to dry at room temperature. After drying, the coating's thermochromic nature was apparent by its color response to finger contact. The Licritherm™ TCS-1001 paint was formulated by the manufacturer to be sensitive to temperature changes near normal human body temperature. According to vendor measurements, the red start temperature occurred at 27.1° C, the product became clear again at 43.3° C.

The respirators that were coated with TCS-1001 were worn by several persons. Participants were asked to wear the respirator for about 30 seconds, remove it, and observe the color pattern on the face seal. In many cases, there were locations on the face seal where the color had not changed. In several cases, two black streaks were observed where the face seal material was meant to contact the sides of the nose. Another common observation was spots or streaks in the area that would contact either side of the chin.

Based on the pattern observed, participants adjusted the straps or nose clip in order to provide better facial contact in the areas where no color was observed. After wearing the respirator again for another 30 seconds and removing it for observation, the color pattern, in most cases, was more uniform, indicating better facial contact and thus better fit. Areas that on the first trial were colorless now displayed color.

Despite adjustments, several participants could not obtain a uniform color pattern on the face seal. These persons commented, however, that this respirator had never fit them very well.

This invention may take on various modifications and alterations without departing from the spirit and scope thereof. Accordingly, it is to be understood that this invention is not to be limited to the above-described, but it is to be controlled by the limitations set forth in the following claims and any equivalents thereof. It is also to be understood that this invention may be suitably practiced in the absence of any element not specifically disclosed herein.

What is claimed is:

1. A respirator that comprises:

a respirator body configured to fit over at least the nose and mouth of a wearer; and a thermochromic material positioned on the respirator body such that the thermochromic material makes thermal contact with the wearer's face when the respirator is worn, the thermal contact causing the thermochromic material to change color to allow the wearer to determine if a proper fit is established.

2. The respirator of claim 1, wherein the thermochromic material is disposed on a face seal of the respirator body about the whole periphery thereof.

3. The respirator of claim 2, wherein the face seal is black.

4. The respirator of claim 1, wherein the thermochromic material includes liquid crystals.

5. The respirator of claim 4, wherein the liquid crystals are cholesteric, chiral nematic, or combinations thereof.

6. The respirator of claim 1, wherein the thermochromic materials demonstrate reversible color change.

7. The respirator of claim 1, wherein the thermochromic material has a red start temperature of about 27° C. and 17° C. bandwidth.

8. The respirator of claim 1, wherein the thermochromic material has red start temperature of about 30° C. and a 10° C. bandwidth.

9. The respirator of claim 1, wherein the thermochromic material is a temperature-insensitive liquid crystal formulation that has a red clearing point of about 37° C.

10. The respirator of claim 1 being a surrogate respirator.

11. A method of evaluating the fit of a respirator on a person's face, which comprises the steps of:

placing a respirator over at least the nose and mouth of a person, wherein the respirator has a thermochromic material positioned on the respirator such that the thermochromic material makes thermal contact with the wearer's face when the respirator is placed over the nose and mouth of a wearer;

displacing the respirator from the wearer's face; and then visually examining the thermochromic material on the respirator to ascertain color changes that indicate where the respirator does and does not make thermal contact with the person's face.

12. The method of claim 11, wherein the thermochromic material is a liquid crystal formulation that demonstrates reversible color change and that is disposed on a black colored face seal of the respirator about the black colored face seal's whole periphery.

* * * * *

UNITED STATES PATENT AND TRADEMARK OFFICE
CERTIFICATE OF CORRECTION

PATENT NO. : 5,617,849
DATED : April 8, 1997
INVENTOR(S) : James E. Springett et al.

It is certified that error appears in the above-indentified patent and that said Letters Patent is hereby corrected as shown below:

Title Page, Item [56], insert

--OTHER PUBLICATIONS

Patent Abstracts of Japan, Vol. 6, No. 166, P. 138 (8/31/82)

Patent Abstracts of Japan, Vol. 9, No. 239, P. 391 (9/25/85)--

Col. 5, line 12, "thermochromie" should read --thermochromic--.

Signed and Sealed this

Second Day of September, 1997

Attest:

BRUCE LEHMAN

Attesting Officer

Commissioner of Patents and Trademarks